United States Patent
Kendall et al.

(10) Patent No.: US 10,873,585 B2
(45) Date of Patent: Dec. 22, 2020

(54) SYSTEM FOR DETECTING UNAUTHORIZED ACCESS VIA CARD CHARACTERISTIC VERIFICATION

(71) Applicant: BANK OF AMERICA CORPORATION, Charlotte, NC (US)

(72) Inventors: Charles Russell Kendall, Snoqualmie, WA (US); Heather Roseann Dolan, Sarasota, FL (US); Therese H. Willis, Apopka, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 224 days.

(21) Appl. No.: 16/105,414

(22) Filed: Aug. 20, 2018

(65) Prior Publication Data
US 2020/0059475 A1 Feb. 20, 2020

(51) Int. Cl.
*H04L 29/06* (2006.01)
*G06Q 20/10* (2012.01)
*G06Q 20/40* (2012.01)

(52) U.S. Cl.
CPC ........ *H04L 63/102* (2013.01); *H04L 63/0853* (2013.01); *G06Q 20/105* (2013.01); *G06Q 20/1085* (2013.01); *G06Q 20/4018* (2013.01)

(58) Field of Classification Search
CPC . H04L 63/102; H04L 63/0853; G06Q 20/105; G06Q 20/1085; G06Q 20/4018
USPC .......................................................... 726/4
See application file for complete search history.

(56) References Cited

U.S. PATENT DOCUMENTS

| | | |
|---|---|---|
| 5,466,918 A | 11/1995 | Ray et al. |
| 5,799,092 A | 8/1998 | Kristol et al. |
| 6,049,627 A | 4/2000 | Becker et al. |
| 6,321,981 B1 | 11/2001 | Ray et al. |
| 6,536,665 B1 | 3/2003 | Ray et al. |
| 6,788,800 B1 | 9/2004 | Carr et al. |
| 6,816,058 B2 | 11/2004 | McGregor et al. |
| 7,584,885 B1 | 9/2009 | Douglass |
| 7,860,268 B2 | 12/2010 | Alasia et al. |
| 8,172,134 B1 | 5/2012 | Ramachandran et al. |
| 8,225,991 B2 | 7/2012 | Smith et al. |
| 8,302,856 B1 | 11/2012 | Grimm et al. |

(Continued)

FOREIGN PATENT DOCUMENTS

JP 03185585 A 8/1991

*Primary Examiner* — Michael S McNally
(74) *Attorney, Agent, or Firm* — Michael A. Springs; Moore & Van Allen PLLC; Nicholas C. Russell

(57) ABSTRACT

Embodiments of the present invention provide a system for detecting unauthorized access via card characteristic verification. The present invention is configured to identify initiation of a resource distribution event via a resource distribution card at a resource distribution device, identify one or more characteristics of the resource distribution card, determine a first user associated with the resource distribution card based on the one or more characteristics, determine that the resource distribution card of the first user is associated with an issuing entity associated with a resource account of the first user based on the one or more characteristics, and authorize and process the resource distribution event based on determining that the resource distribution card is associated with the issuing entity associated with the resource account associated with the first user.

19 Claims, 6 Drawing Sheets

(56) References Cited

U.S. PATENT DOCUMENTS

| | | |
|---|---|---|
| 8,448,849 B1 | 5/2013 | Jenkins et al. |
| 8,474,697 B2 | 7/2013 | Carpenter et al. |
| 8,944,317 B2 | 2/2015 | Lewis et al. |
| 9,070,233 B2 | 6/2015 | Dowling et al. |
| 9,679,278 B2 | 6/2017 | Drummond et al. |
| 2004/0074973 A1 | 4/2004 | Schneck et al. |
| 2005/0144444 A1* | 6/2005 | Hall ........................ G07C 9/22 713/168 |
| 2005/0190914 A1 | 9/2005 | Chen et al. |
| 2005/0242194 A1 | 11/2005 | Jones et al. |
| 2006/0131389 A1* | 6/2006 | Kwon ..................... G07D 7/004 234/380 |
| 2007/0067833 A1* | 3/2007 | Colnot ..................... H04L 63/10 726/9 |
| 2008/0033877 A1* | 2/2008 | Blair ....................... G06Q 20/40 705/44 |
| 2008/0040276 A1* | 2/2008 | Hammad ............. G06Q 20/401 705/44 |
| 2009/0119213 A1* | 5/2009 | Hammad ............. G06Q 20/352 705/44 |
| 2009/0249497 A1* | 10/2009 | Fitzgerald ............. H04W 12/12 726/35 |
| 2019/0295084 A1* | 9/2019 | Edwards ............. G06Q 20/354 |

\* cited by examiner

SYSTEM FOR DETECTING UNAUTHORIZED ACCESS VIA CARD CHARACTERISTIC VERIFICATION

BACKGROUND

Present conventional systems do not have advanced capabilities to detect unauthorized access using a duplicate resource distribution card comprising one or more characteristics of an original resource distribution card. Thus, there exists a need for a system with advanced capabilities to detect unauthorized access initiated at resource distribution devices.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for providing a holistic and secure resource provisioning gateway. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies initiation of a resource distribution event via a resource distribution card at a resource distribution device, identifies one or more characteristics of the resource distribution card, determines a first user associated with the resource distribution card based on the one or more characteristics, determines that the resource distribution card of the first user is associated with an issuing entity associated with a resource account of the first user based on the one or more characteristics, and authorizes and processes the resource distribution event based on determining that the resource distribution card is associated with the issuing entity associated with the resource account associated with the first user.

In some embodiments, the present invention identifies the one or more characteristics of the resource distribution card by transmitting control signals to the resource distribution device to capture the one or more characteristics via one or more components of the resource distribution device.

In some embodiments, the present invention determines that the resource distribution card of the first user is associated with an issuing entity associated with a resource account of the first user based on determining that the one or more characteristics of the resource distribution card match a system of record.

In some embodiments, the present invention determines that the resource distribution card of the first user is not associated with the issuing entity associated with the resource account and transmits first set of control signals to cause the resource distribution device to capture a first image of the resource distribution card.

In some embodiments, the present invention identifies that a second user initiated the resource distribution event at the resource distribution device via the resource distribution card of the first user based on determining that the resource distribution card of the first user is not associated with the issuing entity associated with the resource account and transmits second set of control signals to the resource distribution device to capture a second image of the second user.

In some embodiments, the present invention determines that the resource distribution card of the first user is not associated with the issuing entity associated with the resource account and transmits control signals to cause the resource distribution device to reprogram the resource distribution card.

In some embodiments, the present invention transmits the control signals to cause the resource distribution device to reprogram the resource distribution card by rewriting magnetic strip on the resource distribution card with a second set of dummy characteristics.

In some embodiments, the present invention transmits the control signals to cause the resource distribution device to reprogram the resource distribution card by replacing an existing application in a chip of the resource distribution card with a different application.

In some embodiments, the present invention transmits the control signals to cause the resource distribution device to reprogram the resource distribution card by replacing an existing token in a chip of the resource distribution card with a different token.

In some embodiments, the present invention determines that the resource distribution card of the first user is not associated with the issuing entity associated with the resource account and transmits a notification to at least one other resource distribution devices and at least one entity system, wherein the notification comprises information associated with the resource distribution card used for initiating the resource distribution event.

In some embodiments, the present invention identifies the one or more characteristics of the resource distribution card by determining at least one of a first weight, Card Verification Value (CVV), a three dimensional barcode, a secure token, information in one or more tracks, front image, and back image of the resource distribution card.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
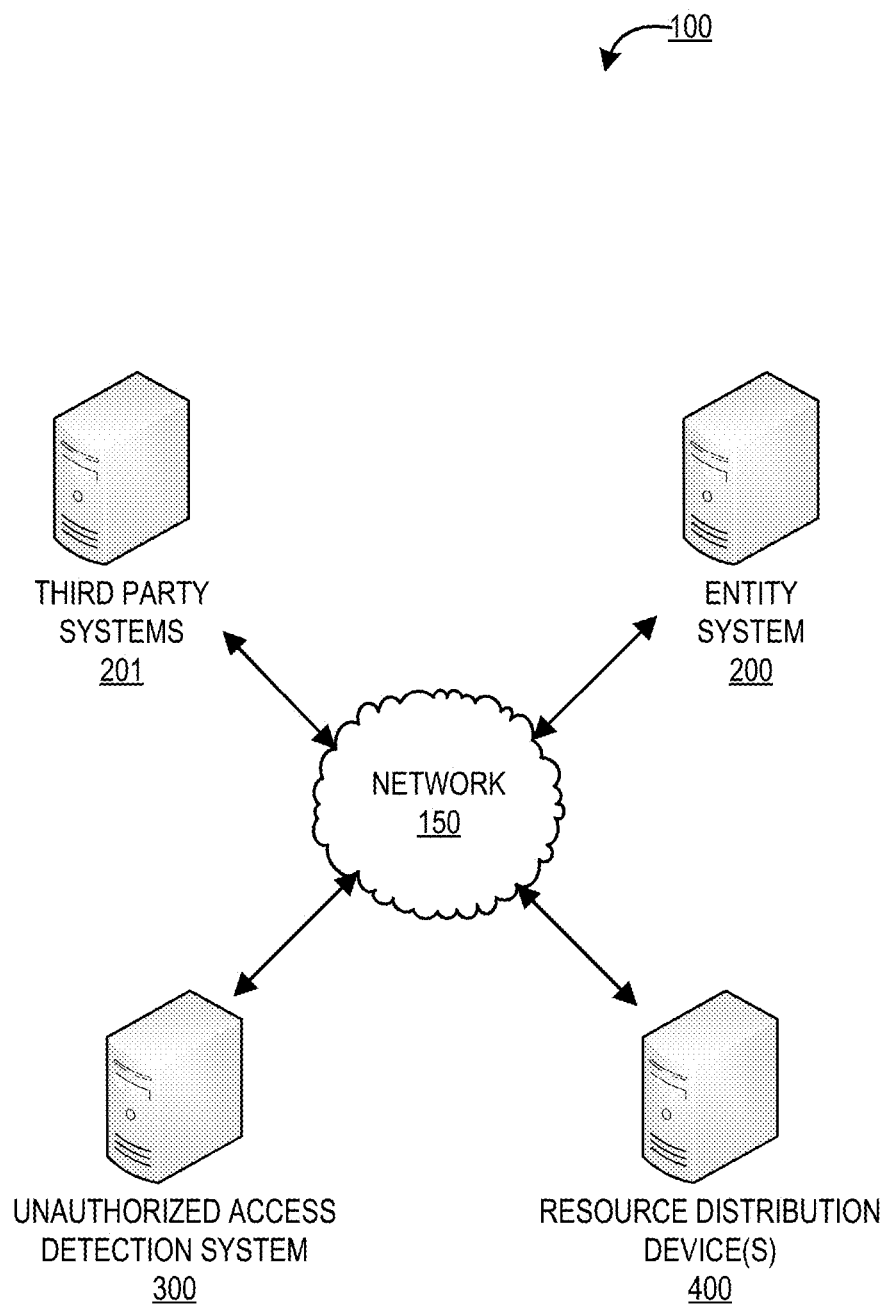
Figure 2:
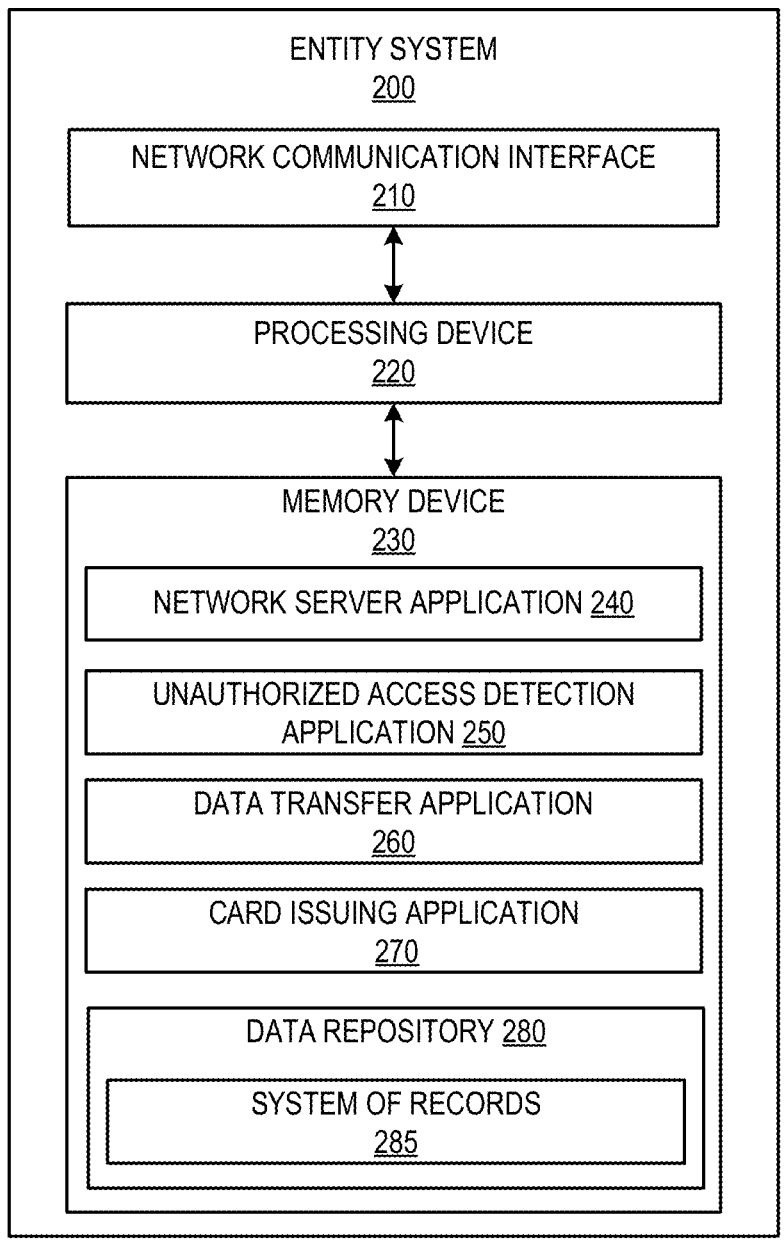
Figure 3:
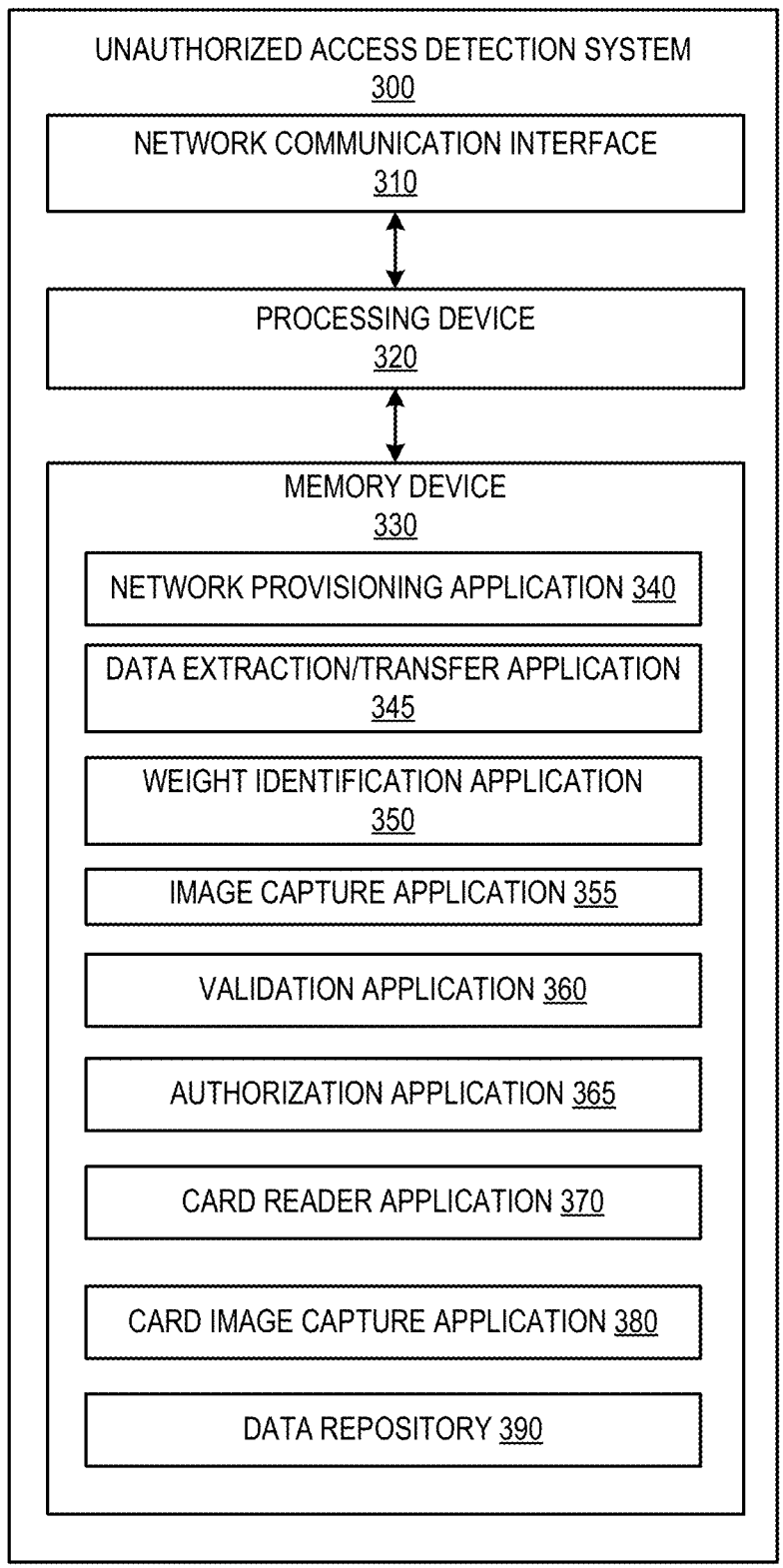
Figure 4:
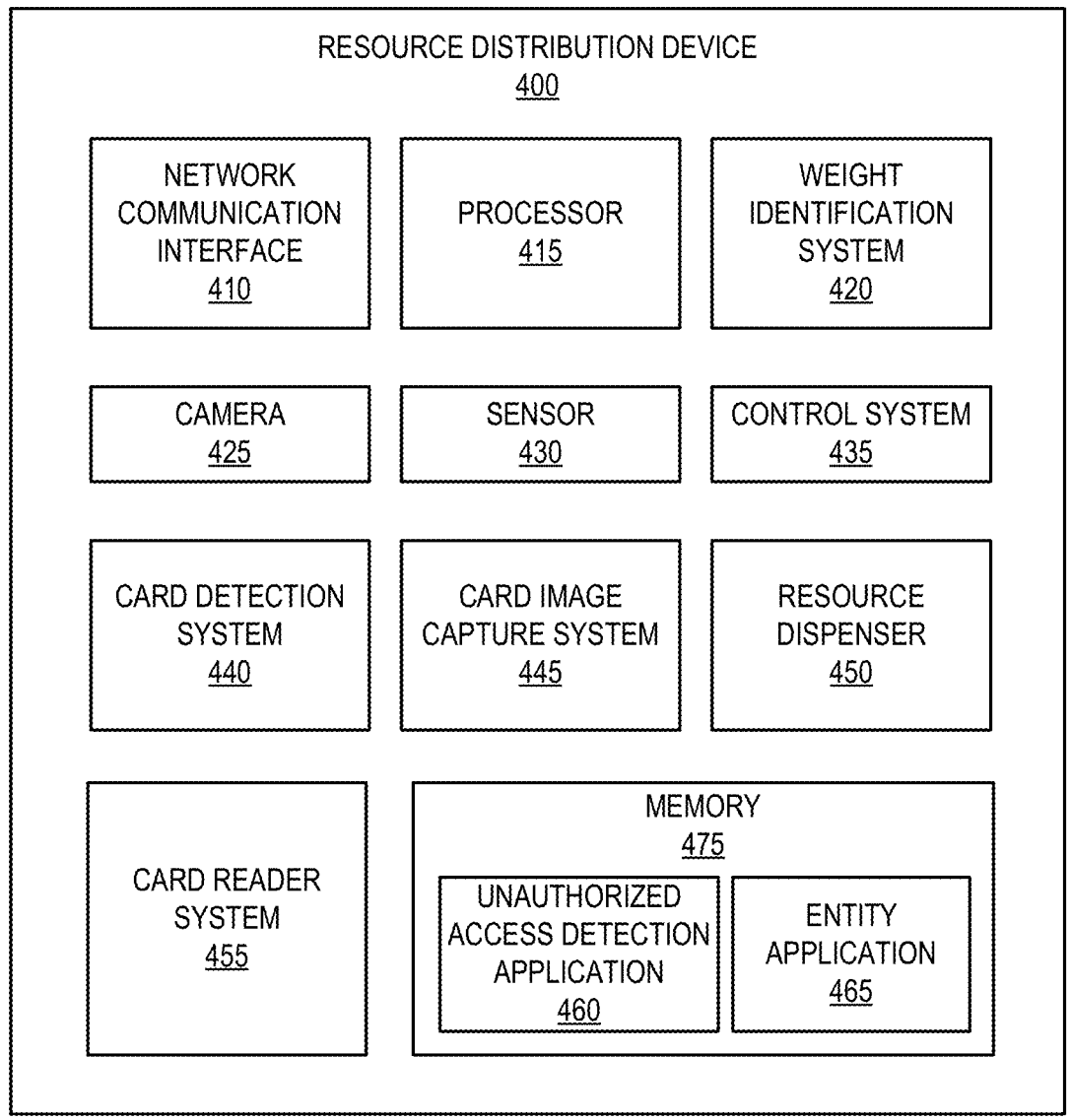
Figure 5:
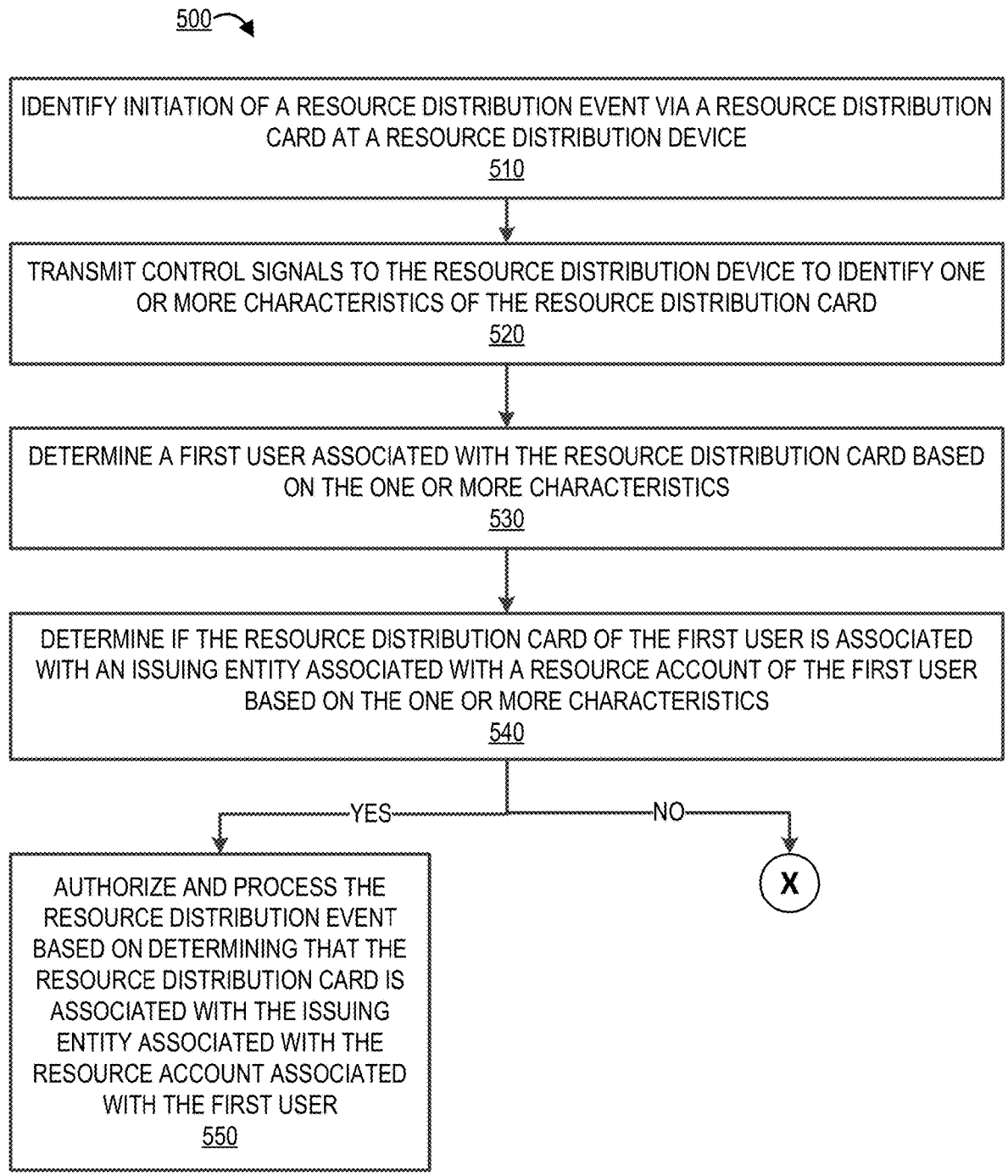
Figure 6:
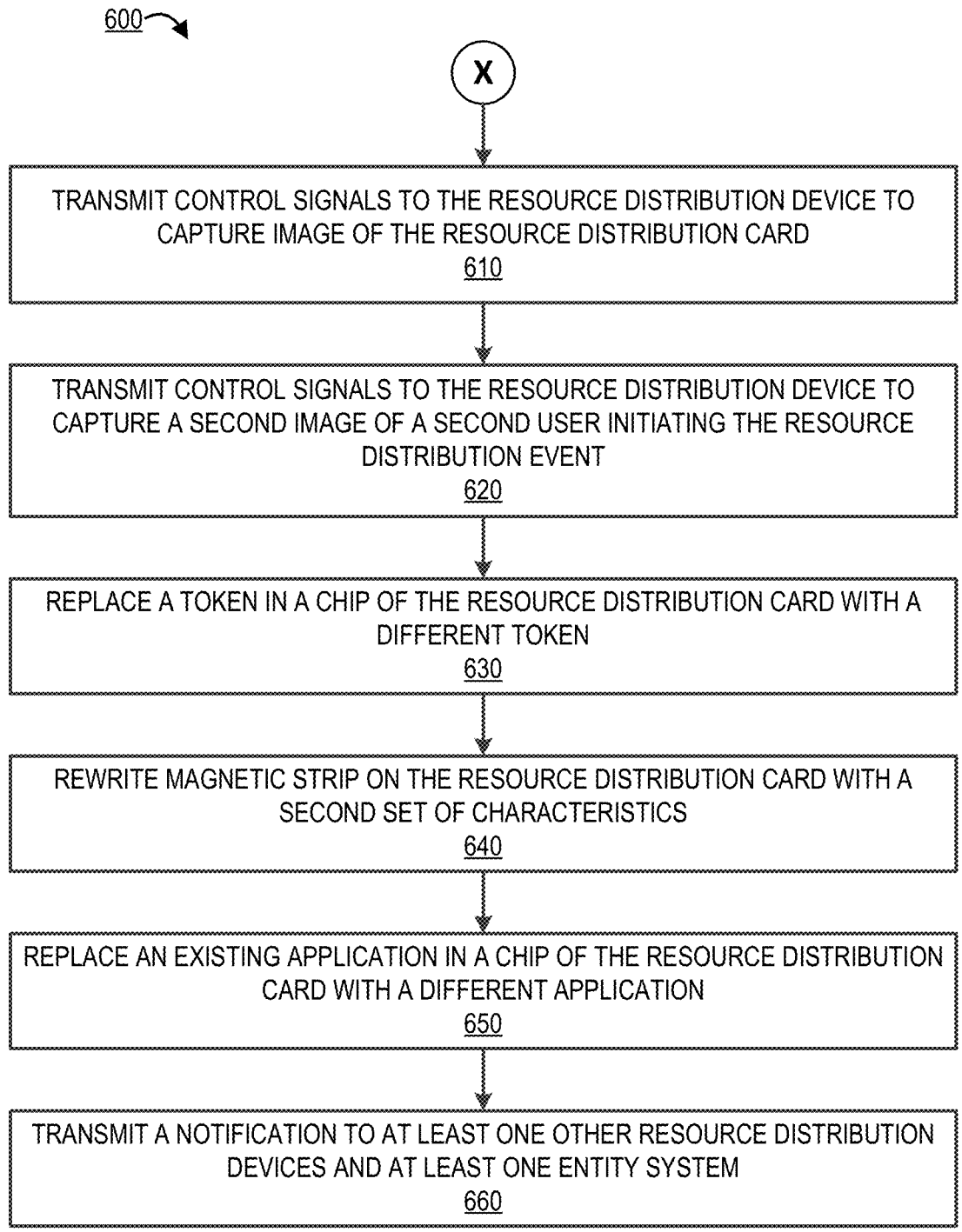

Having thus described embodiments of the invention in general terms, reference will now be made the accompanying drawings, wherein:

FIG. 1 provides a block diagram illustrating a system environment for detecting unauthorized access via card characteristic verification, in accordance with an embodiment of the invention;

FIG. 2 provides a block diagram illustrating the entity system 200 of FIG. 1, in accordance with an embodiment of the invention;

FIG. 3 provides a block diagram illustrating a unauthorized access detection system 300 of FIG. 1, in accordance with an embodiment of the invention;

FIG. 4 provides a block diagram illustrating a resource distribution device 400 of FIG. 1, in accordance with an embodiment of the present invention;

FIG. 5 provides a flowchart illustrating a process flow for detecting unauthorized access via card characteristic verification, in accordance with an embodiment of the invention; and FIG. 6 provides a flowchart illustrating a process flow for mitigating exposes associated with identified unauthorized access, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "resource distribution device" described herein may be any devices or financial instruments that are involved in distribution of resources such as cash, checks, electronic transfers, goods, services, vouchers, money orders or the like which may be performed using a resource distribution card (e.g., credit card, debit card, membership card, or the like). In some embodiments, the resource distribution device may be owned or maintained by a financial entity. In some embodiments, the resource distribution devices may be owned or maintained by a third party entity. In some embodiments of the present invention, the resource distribution device may be an Automated Teller Machine (ATM). In some embodiments of the present invention, the resource distribution device may be a POS device.

As used herein, the term "resource distribution card" may be a credit card, debit card, membership card, or the like associated with a resource account of a customer of an entity. The resource account may be a debit account, checking account, savings account, credit card, investment account, mortgage account, or the like. The resource distribution card typically includes track 1, track 2, and track 3 data. Track 1 data may include primary account number, name, service code, expiration date, or the like. Track 2 data may include primary account number, expiration date, service code, CVV, or the like. Track 3 data may include primary account number, country code, currency code, currency exponent, amount authorized per cycle, cycle begin, cycle length, retry count, pin control parameters, card security number, first subsidiary account number, other discretionary data, and the like.

Present conventional systems do not have advanced capabilities to detect unauthorized access using a duplicate resource distribution card comprising one or more characteristics of an original resource distribution card. For example, any card with a magnetic strip can be rewritten to have the characteristics such as track data of an original credit card associated with a user and such a card may be used by another user to perform a resource distribution event at a resource distribution device. Present conventional systems merely compare the track data and authorize the resource distribution event which may increase the exposure associated with resource distribution events. As such there exists a need for a system to perform advanced authentication methods and validation methods for authoring resource distribution events. The present invention presents a unique solution and has advanced capabilities to detect unauthorized resource distribution events at resource distribution devices.

The present invention is primarily directed to resource distribution events (e.g., transactions such as cash deposit or withdrawal or the like) performed using resource distribution cards (e.g., credit card, debit card, or the like) at resource distribution devices such as an ATM, but may be applicable to any resource distribution events performed at any other resource distribution devices using a resource distribution card.

FIG. 1 provides a block diagram illustrating a system environment 100 for detecting unauthorized access via card characteristic verification, in accordance with an embodiment of the invention. As illustrated in FIG. 1, the environment 100 includes a unauthorized access detection system 300, resource distribution devices 400, entity system 200, and one or more third party systems 201. In some embodiments, the resource distribution devices 400 may be operated, maintained, and/or controlled by the unauthorized access detection system 300. In some embodiments, the resource distribution devices 400 may be operated, maintained, and/or controlled by the entity systems 200. In some embodiments, the resource distribution devices 400 may be operated, maintained, and/or controlled by both the unauthorized access detection system 300 and the entity system 200. In some embodiments, the unauthorized access detection system 300 may be a part of the entity system. In such an embodiment, the unauthorized access detection system 300 may transmit control signals remotely to the resource distribution device 400 to perform one or more actions described herein. In some embodiments, the unauthorized access detection system 300 may be a part of the resource distribution device 400. In such an embodiment, the unauthorized access detection system 300 may communicate with the entity system 200 to perform one or more actions described herein. In some embodiments, the unauthorized access detection system 300 may be an independent system. In such an embodiment, the unauthorized access detection system 300 may communicate with the entity system 200 and transmit control signals to the resource distribution device 400 and cause the resource distribution device 400 to perform one or more actions described herein to identify unauthorized access.

The entity system(s) 200 may be any system owned or otherwise controlled by an entity to support or perform one or more process steps described herein. The entity may be any entity which is involved in financial transactions, including but not limited to, card issuing entity, authorizing entity, settlement entity, or the like. In some embodiments, the managing entity is a financial institution. The unauthorized access detection system 300 and the resource distribution device 400 communicate with entity system 200 to authorize resource distribution events or to identify unauthorized access.

The unauthorized access detection system 300, the entity system 200, the resource distribution device 400, and/or the third party system 201 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, a data transfer application 260, card issuing application 270, and a data repository 280 comprising system of records 285. The computer-executable program code of the network server application 240, the unauthorized access detection application 250, the data transfer application 260, and the card issuing application 270 may instruct the processing device 220 to perform certain logic, data-extraction, and data-storing functions of the entity system 200 described herein, as well as communication functions of the entity system 200.

The network server application 240, the unauthorized access detection application 250, the data transfer application 260, and the card issuing application 270 are configured to store data in the data repository 280 or to use the data stored in the data repository 280 when communicating through the network communication interface 210 with the unauthorized access detection system 300 and the resource distribution device 400 to perform one or more process steps described herein. In some embodiments, the entity system 200 may receive instructions from the unauthorized access detection system 300 via the unauthorized access detection application 250 to perform certain data transfer operations to the unauthorized access detection system 300 and/or the resource distribution device 400. Upon receiving the instructions from the unauthorized access detection system 300, the entity system 200 transfers data via the data transfer application 260. The card issuing application 270 issues resource distribution cards such as credit cards, debit cards, or the like to one or more customers of the entity. Each of the resource distribution cards issued to the one or more customers may comprise different characteristics such as weight, front of the card, back of the card, 3 dimensional barcode, token, or the like. In some embodiments, the card issuing application 270 may issue resource distribution cards with different characteristics based on instructions received from the unauthorized access detection system 300. Upon issuing the resource distribution cards specific to each of the one or more customers, may store the characteristics of each of the resource distribution cards in system of records 285. As such there may be at least one system of record associated with each of the users or customers of the entity.

FIG. 3 provides a block diagram illustrating the unauthorized access detection system 300 in greater detail, in accordance with embodiments of the invention. As mentioned above, the unauthorized access detection system 300 of FIG. 1 is configured to perform the one or more functions described herein.

As illustrated in FIG. 3, in one embodiment of the invention, the unauthorized access detection system 300 includes one or more processing devices 320 operatively coupled to a network communication interface 310 and a memory device 330. In certain embodiments, the unauthorized access detection system 300 is operated by a first entity, such as a financial institution, while in other embodiments, the unauthorized access detection system 300 is operated by an entity other than a financial institution. In some embodiments, the unauthorized access detection system 300 may be an independent system. In alternate embodiments, the unauthorized access detection system 300 may be a part of the entity system 200 or the resource distribution device 400.

It should be understood that the memory device 330 may include one or more databases or other data structures/repositories. The memory device 330 also includes computer-executable program code that instructs the processing device 320 to operate the network communication interface 310 to perform certain communication functions of the unauthorized access detection system 300 described herein. For example, in one embodiment of the unauthorized access detection system 300, the memory device 330 includes, but is not limited to, a network server application 340, a data extraction/transfer application 345, a weight identification application 350, an image capture application 355, a validation application, authorization application 365, a card reader application 370, a card image capture application 380, and a data repository 390. The computer-executable program code of the network server application 340, the data extraction/transfer application 345, the weight identification application 350, the image capture application 355, the validation application, authorization application 365, the card reader application 370, and the card image capture application 380, may instruct the processing device 320 to perform certain logic, data-processing, and data-storing functions of the unauthorized access detection system 300 described herein, as well as communication functions of the unauthorized access detection system 300.

In some embodiments, the network server application 340, the data extraction/transfer application 345, the weight identification application 350, the image capture application 355, the validation application, authorization application 365, the card reader application 370, and the card image capture application 380 may be a part of single application. The network provisioning application 340 may allow the unauthorized access detection system 300 to communicate with the resource distribution device 400 and the entity system to authorize resource distribution events and also to identify unauthorized access. The data extraction/transfer application may extract data from the resource distribution device such as information captured by the resource distribution device 400 and the system of records 285 from the entity system 200 to validate and authorize resource distribution events.

The card reader application 370 may cause the resource distribution device 400 to read information associated with a resource distribution card inserted into the resource distribution device 400. The information may include, but is not limited to, track 1 data, track 2 data, track 3 data, application on a chip of the resource distribution card, a token present in the chip of the resource distribution card, or the like. In some embodiments, the memory device 330 may comprise a three dimensional card reader application which causes a three dimensional image reader in the resource distribution device 400 to read a three dimensional image on the resource distribution card. The weight identification application 350 may cause the unauthorized access detection system 300 to transmit control signals to the resource distribution device 400 to cause the resource distribution device 400 to determine a weight of the resource distribution card inserted into the resource distribution device 400. The card image capture application 380 may capture front and back of the card and may use OCR technology to identify at least a pattern, CVV, or the like on the resource distribution card. The validation application 360 may compare the information captured including, but not limited to, weight, pattern, CVV, token, track data, or the like with the associated system of records 285 extracted via the data extraction/transfer application 345. The authorization application 365 may authorize transfer of resources associated with the resource distribution event based on successful validation performed by the validation application 360. In an embodiment where the validation is unsuccessful, the image capture application 355 may cause the unauthorized access detection system 300 to transmit control signals to the resource distribution device 400 to cause the resource distribution device 400 to capture an image of a user who initiated an unauthorized resource distribution event at the resource distribution device 400. In such an embodiment, the data extraction/transfer application 345 may transmit a notification to the entity system 200, the third party systems 201, other resource distribution systems, or the like.

FIG. 4 provides a block diagram of the resource distribution device 400, in accordance with an embodiment of the present invention. As illustrated in FIG. 4, in one embodiment of the invention, the resource distribution device 400 includes a processor 415 operatively coupled to a network communication interface 410, a memory component 475, a weight identification system 420, a camera 425, a sensor 430, a control system 435, a card detection system 440, a card image capture system 445, a resource dispenser 450, a card reader system 455, or the like. The resource distribution device may include other components such as a display, a speaker, resource acceptor which can accept resources from a user using the resource distribution device 400, or the like.

It should be understood that the memory component 475 may include one or more databases or other data structures/repositories. The memory component 475 also includes computer-executable program code that instructs the processor 415 to operate the network communication interface 410 to perform certain communication functions of the resource distribution device 400 described herein and also instructs the processor 415 to cause the control system 435 to perform certain actions of the resource distribution device 400 including, but not limited to, dispensing resources, accepting resources, accepting resource distribution cards, processing a resource distribution event, or the like via the weight identification system 420, the camera 425, the sensor 430, the control system 435, a card detection system 440, a card image capture system 445, a resource dispenser 450, a card reader system 455. In one embodiment, the memory component may include an unauthorized access detection application 460 provided by the resource distribution device 400, an entity application 465 provided by the entity system 200. In some embodiments, the memory component 475 may include only the unauthorized access detection application 460 which may allow the resource distribution device 400 to communicate with the entity system 200. Based on the instructions and control signals received from the unauthorized access detection system 300 via network communication interface and the unauthorized access detection application 460, the processor 415 via the control system 435 may cause the weight identification system 420, the camera 425, the sensor 430, the card detection system 440, the card image capture system 445, the resource dispenser, the card reader system 455 to perform certain action described herein.

The processor 415, via the control system 435, may use the weight identification system 420 to determine a weight of the resource distribution card after receiving instructions from the unauthorized access detection system. The processor 415, via the control system 435, may use the camera 425 to capture an image of a customer who initiated the resource distribution event. The processor 415, via the control system 435, may use the card detection system to detect the insertion of a resource distribution card into the resource distribution device 400. The processor 415, via the control system 435, may use the sensor 430 to determine whether the resource distribution card was inserted properly into the resource distribution device 400. The processor 415, via the control system 435, may use the card image capture system 445 to capture the front and back of the resource distribution card. The processor 415, via the control system 435, may use the resource dispenser 450 to dispense resources to the customer upon authorization of the distribution of resources associated with the resource distribution event. The processor 415, via the control system 435, may use the card reader system 455 to read information present in the resource distribution card inserted into the resource distribution device 400. In some embodiments, the resource distribution device 400 may include a three dimensional image scanner to scan and identify three dimensional code present on the resource distribution cards.

FIG. 5 provides a flowchart illustrating a process flow 500 for detecting unauthorized access. As shown in block 510, the system identifies initiation of a resource distribution event via a resource distribution card at a resource distribution device. In an embodiment, the system may identify that a resource distribution card is inserted into resource distribution device via one or more components of the resource distribution device. For example, the system may identify that a credit card is inserted by a user into an Automated Teller Machine based on the signals received from a sensor and a card reader in the Automated Teller Machine.

As shown in block 520, the system transmits control signals to the resource distribution device to identify one or more characteristics of the resource distribution card. The resource distribution card may be a credit card, debit card, membership card, or the like. One or more characteristics may include CVV, token present in the chip of the card, three dimensional barcode, pattern on the face of the card, track 1 data, track 2 data, track 3 data, or any other information present in the resource distribution card. In one exemplary embodiment, the system may transmit controls signals to the automated teller machine which cause the automated teller machine to identify weight of the resource distribution card. Although CVV information is included in track data associated with the resource distribution card, the system identifies a CVV on the image of the card captured by the resource distribution device using optical character recognition (OCR) technology.

As shown in block 530, the system determines a first user associated with the resource distribution card based on the one or more characteristics. For example, the system identifies that a credit card inserted into an automated teller machine is associated with a first user based on the track data identified by the system. In one embodiment, the system may identify an issuing entity associated with the resource account or resource pool of the first user based on the one or more characteristics. For example, the system may identify the issuing entity based on the pattern or a logo on a credit card inserted into an automated teller machine. Additionally, the system may identify the resource account associated with the first user based on the one or more characteristics. For example, the system may identify an account number and other account information based on extracting or receiving all user accounts associated with the first name and last name of the user from the issuing entity system. Alternatively, the system may identify the first name, resource account information, and the issuing entity information based on the one or more characteristics on the resource distribution card. In an embodiment, upon identifying the issuing entity, the system may send a request to the issuing entity system for a system of record associated with the first user. The system of record may comprise information associated with a set of characteristics. For example, the system of record associated with a first user may comprise that the credit card of the first user weighs seven grams, the pattern on the face of the credit card has an image of a dog, track 3 data and the like.

As shown in block 540, the system determines if the resource distribution card of the first user is associated with an issuing entity associated with a resource account of the first user based on the one or more characteristics. The system may compare the identified one or more characteristics with a set of characteristics in the system of record associated with the first user to determine whether the one or more characteristics are a match. Continuing with the previous example, the system may identify that the weight of the credit card, comprising the account number associated with the first user, which was inserted into the automated teller machine weighs five grams and the face of the credit card comprises just a logo of a third party entity and may compare the weight and the logo present on the credit card inserted into the ATM with the information in the system of record. Based on comparing the weights, the system may identify if there is a mismatch between the identified characteristics and the set of characteristics in the system of record. In one embodiment, the system may perform additional validation by transmitting control signals to the resource distribution device to cause the device to scan the resource distribution card inserted into the resource distribution device to identify one or more finger prints on the resource distribution card. The system may then compare the identified one or more finger prints with a finger print in the system of record associated with the first user to identify a match.

As shown in block 550, the system authorizes and processes the resource distribution event based on determining that the resource distribution card is associated with the issuing entity associated with the resource account associated with the first user. In one embodiment, the system after authorizing the resource distribution event, distributes resources (such as cash, check, goods, coupons, or the like) associated with the resource distribution event.

FIG. 6 provides a flowchart illustrating a process flow for mitigating exposes associated with identified unauthorized access, in accordance with an embodiment of the invention. Based on determining that the resource distribution card is not associated with the issuing entity associated with the resource account of the first user, the system performs at least one of the steps described in the process flow 600. In other words, the system determines that the resource distribution card utilized in initiating the resource distribution event is not the original card of the first user which is issued by the issuing entity associated with the resource account of the first user. In some embodiments, the system may perform a combination of the one or more steps described in the process flow 600 after determining that the resource distribution card is not associated with the issuing entity. In one embodiment, the system may deny the resource distribution event based on detecting that the resource distribution card inserted into the resource distribution device is not an original card of the first user and may perform a combination of one or more steps described in the process flow 600. In such an embodiment, the system does not display that the transaction has been denied until the one or more steps of the process flow 600 have been completed by the resource distribution device.

In another embodiment, the system in response to detecting that the resource distribution card inserted into the resource distribution device is not an original card of the first user based on identifying a mismatch between the identified characteristics and the set of characteristics in the system of record, may transmit control signals to the resource distribution device to cause the resource distribution device to display a request for additional authentication. In one embodiment, the additional authentication may be a biometric authentication. For example, the system may cause the ATM to display a request for biometrics from the user. In response to displaying the request, the user may submit the biometrics to the system via a biometric scanner present in the ATM. In another embodiment, the additional authentication may comprise causing the resource distribution device to display a request for a secret validation code set by the first user while opening the resource pool associated with the resource distribution card. In yet another embodiment, the system may perform facial recognition using one or more components of the resource distribution device to validate the user initiating the resource distribution event at a resource distribution device. Additional authentication may be useful when the resource distribution card is worn out. In other words, when the first user initiates a resource distribution event at a resource distribution device, instead of denying the resource distribution event and performing the one or more steps based on a mismatch in a pattern on the face of the card, the system validates the resource distribution event using another form of authentication.

As shown in block 610, the system transmits control signals to the resource distribution device to capture image of the resource distribution card. The resource distribution device after receiving the control signals from the system, captures a front image and a back image of the resource distribution card which was inserted into the resource distribution device.

As shown in block 620, the system transmits control signals to the resource distribution device to capture a second image of a second user initiating the resource distribution event. In other words, based on detecting unauthorized access, the system may identify that a user initiating the resource distribution event is not the first user associated with the resource account and the resource distribution card associated with the account and may transmit control signals to the resource distribution device to capture an image of the user standing in front of the resource distribution device. In some embodiments, in response to receiving the control signals from the system, the resource distribution device may capture an image of the user initiating an unauthorized resource distribution event and may transfer it back to the system. In such an embodiment, the system may transfer and alert the image to entity system and concerned authorities.

As shown in block 630, the system replaces a token in a chip of the resource distribution card with a different token. The system may replace the token in the chip of the resource distribution card with a different token by transmitting control signals along with the different token to the resource distribution device to cause a magnetic writer or chip writer present in the resource distribution device to rewrite the token in the chip.

As shown in block 640, the system rewrites a magnetic strip on the resource distribution card with a second set of characteristics. The system may rewrite the magnetic strip on the resource distribution card with the second set of characteristics by transmitting control signals along with the second set of characteristics to the resource distribution device to cause a magnetic writer present in the resource distribution device to rewrite the magnetic strip in the chip.

As shown in block 650, the system replaces an existing application in a chip of the resource distribution card with a different application. The chip of the resource distribution card may comprise one or more applications to facilitate the process of distribution of resources. In one embodiment, the system may transmit control signals to the resource distribution device to cause the device to replace the existing application with a different application provided by the system. In one embodiment, the system may transmit control signals to erase the existing application in the chip of the resource distribution card.

As shown in block 660, the system transmits a notification to at least one other resource distribution devices and at least one entity system. The system may transmit one or more notifications to the at least one other entity system about the unauthorized access and steps performed by the system to mitigate associated exposures. In one embodiment, the system may transmit one or more notifications to all other resource distribution devices to deny all further transactions associated with the duplicate resource distribution card utilized by the second user. In one embodiment, the entity such as a financial institution which owns the system of the present invention may provide or facilitate resource distribution devices equipped to perform one or more steps described herein.

In some embodiments, the system of the present invention increases an exposure score associated with the first user whenever the system detects an unauthorized resource distribution event. In one embodiment, the system may detect that the exposure score associated with the first user is above a threshold value set by the entity or the first user and may issue a new resource distribution card to the first user. In another embodiment, the system may detect that the exposure score associated with the first user is above a threshold value and may perform additional authentication before authorizing a resource distribution event. In yet another embodiment, the system may detect that the exposure score associated with the first user is above a threshold value and may transmit alerts to at least one user device of the first user, entity system, and other resource distribution devices.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for detecting unauthorized access via card characteristic verification, the system comprising:
   at least one non-transitory storage device; and
   at least one processing device coupled to the at least one non-transitory storage device, wherein the at least one processing device is configured to:
   identify initiation of a resource distribution event via a resource distribution card at a resource distribution device;
   identify one or more characteristics of the resource distribution card;
   determine a first user associated with the resource distribution card based on the one or more characteristics;
   determine that the resource distribution card of the first user is not associated with an issuing entity associated with a resource account of the first user based on the one or more characteristics; and
   transmit control signals to cause the resource distribution device to reprogram the resource distribution card.

2. The system of claim 1, wherein the at least one processing device is configured to identify the one or more characteristics of the resource distribution card by transmitting control signals to the resource distribution device to capture the one or more characteristics via one or more components of the resource distribution device.

3. The system of claim 1, wherein the at least one processing device is configured to determine that the resource distribution card of the first user is associated with the issuing entity associated with the resource account of the first user based on determining that the one or more characteristics of the resource distribution card do not match a system of record.

4. The system of claim 1, wherein the at least one processing device is configured to:
   in response to determining that the resource distribution card of the first user is not associated with the issuing entity associated with the resource account, transmit first set of control signals to cause the resource distribution device to capture a first image of the resource distribution card.

5. The system of claim 1, wherein the at least one processing device is configured to:
   identify that a second user initiated the resource distribution event at the resource distribution device via the resource distribution card of the first user based on determining that the resource distribution card of the first user is not associated with the issuing entity associated with the resource account; and
   transmit second set of control signals to the resource distribution device to capture a second image of the second user.

6. The system of claim 1, wherein the at least one processing device is configured to transmit the control signals to cause the resource distribution device to reprogram the resource distribution card by replacing an existing application in a chip of the resource distribution card with a different application.

7. The system of claim 1, wherein the at least one processing device is configured to transmit the control signals to cause the resource distribution device to reprogram the resource distribution card by replacing an existing token in a chip of the resource distribution card with a different token.

8. The system of claim 1, wherein the at least one processing device is configured to:
   in response to determining that the resource distribution card of the first user is not associated with the issuing entity associated with the resource account, transmit a notification to at least one other resource distribution devices and at least one entity system, wherein the notification comprises information associated with the resource distribution card used for initiating the resource distribution event.

9. The system of claim 1, wherein the at least one processing device is configured to identify the one or more characteristics of the resource distribution card by determining one or more of a first weight, Card Verification Value (CVV), a three dimensional code, a secure token, information in one or more tracks, front image, and back image of the resource distribution card.

10. A computer program product for detecting unauthorized access via card characteristic verification, the computer program product comprising a non-transitory computer-readable storage medium having computer-executable instructions for causing a computer processor to perform the steps of:
   identifying initiation of a resource distribution event via a resource distribution card at a resource distribution device;
   identifying one or more characteristics of the resource distribution card;
   determining a first user associated with the resource distribution card based on the one or more characteristics;
   determining that the resource distribution card of the first user is not associated with an issuing entity associated with a resource account of the first user based on the one or more characteristics; and
   transmitting control signals to cause the resource distribution device to reprogram the resource distribution card.

11. The computer program product of claim 10, wherein the computer-executable instructions further cause the computer processor to perform the step of identifying the one or more characteristics of the resource distribution card by transmitting control signals to the resource distribution device to capture the one or more characteristics via one or more components of the resource distribution device.

12. The computer program product of claim 10, wherein the computer-executable instructions further cause the computer processor to perform the step of determining that the resource distribution card of the first user is not associated with the issuing entity associated with the resource account of the first user based on determining that the one or more characteristics of the resource distribution card do not match a system of record.

13. The computer program product of claim 10, wherein the computer-executable instructions further cause the computer processor to perform the steps of:
   in response to determining that the resource distribution card of the first user is not associated with the issuing entity associated with the resource account, transmitting first set of control signals to cause the resource distribution device to capture a first image of the resource distribution card.

14. The computer program product of claim 10, wherein the computer-executable instructions further cause the computer processor to perform the steps of:
   identifying that a second user initiated the resource distribution event at the resource distribution device via the resource distribution card of the first user based on determining that the resource distribution card of the first user is not associated with the issuing entity associated with the resource account; and
   transmitting second set of control signals to the resource distribution device to capture a second image of the second user.

15. A computerized method for detecting unauthorized access via card characteristic verification, the method comprising:
   identifying initiation of a resource distribution event via a resource distribution card at a resource distribution device;
   identifying one or more characteristics of the resource distribution card;
   determining a first user associated with the resource distribution card based on the one or more characteristics;
   determining that the resource distribution card of the first user is not associated with an issuing entity associated with a resource account of the first user based on the one or more characteristics; and
   transmitting control signals to cause the resource distribution device to reprogram the resource distribution card.

16. The computerized method of claim 15, wherein identifying the one or more characteristics of the resource distribution card comprises transmitting control signals to the resource distribution device to capture the one or more characteristics via one or more components of the resource distribution device.

17. The computerized method of claim 15, wherein the computerized method further comprises:
   in response to determining that the resource distribution card of the first user is not associated with the issuing entity associated with the resource account, transmitting first set of control signals to cause the resource distribution device to capture a first image of the resource distribution card.

18. The computerized method of claim 15, wherein the computerized method further comprises:
   identifying that a second user initiated the resource distribution event at the resource distribution device via the resource distribution card of the first user based on determining that the resource distribution card of the first user is not associated with the issuing entity associated with the resource account; and
   transmitting second set of control signals to the resource distribution device to capture a second image of the second user.

19. The computerized method of claim 15, wherein determining that the resource distribution card of the first user is not associated with the issuing entity associated with the resource account of the first user is based on determining that the one or more characteristics of the resource distribution card do not match a system of record.

* * * * *